United States Patent

[11] 3,553,369

[72] Inventor Walter Flohrer
Post Gauting, Germany
[21] Appl. No. 699,824
[22] Filed Jan. 23, 1968
[45] Patented Jan. 5, 1971
[73] Assignees Siemens Aktiengesellschaft
Berlin, and Munich, Germany
[32] Priority Jan. 25, 1967
[33] Germany
[31] No. S107989

[54] SUPERVISION CIRCUIT FOR SYNCHRONIZATION TRANSMITTERS
8 Claims, 6 Drawing Figs.

[52] U.S. Cl. 178/69, 179/175.2
[51] Int. Cl. H04b 3/46, H04m 3/22
[50] Field of Search 178/69G, 69.5; 179/15T; 340/409, (Cursory); 325/41; 179/175.2C

[56] References Cited
UNITED STATES PATENTS
3,161,732 12/1964 Martin et al. 179/175.2

*Primary Examiner*—Kathleen H. Claffy
*Assistant Examiner*—Thomas W. Brown
*Attorney*—Birch, Swindler, McKie & Beckett

ABSTRACT: A circuit to supervise synchronization transmitters to determine if they are functioning properly, and if not, to substitute therefor correctly operating synchronization transmitters. A transistor arrangement is provided to obtain criteria indicative of the operating condition of the synchronization transmitters. A plurality of synchronization transmitters may be supervised to determine the operating conditions thereof with a single supervision circuit. Asynchronous operation of the transmitters is also indicated by the supervision circuit.

SUPERVISION CIRCUIT FOR SYNCHRONIZATION TRANSMITTERS

CROSS-REFERENCE TO RELATED APPLICATION

Applicant claims priority from corresponding German application Ser. No. S107,989 filed Jan. 25, 1967, in Germany.

BACKGROUND OF THE INVENTION

1. Field of the Invention

The invention concerns a supervision circuit to determine the operating condition of synchronization transmitters. It has particular utility in communication systems, although its use is not limited thereto.

2. State of the Prior Art

The prior art teaches the utilization of synchronization transmitters that may be mechanical or electrical in nature, for example. When utilizing mechanical synchronization transmitters, an examination of the system and maintenance thereof by repairing or replacing defective parts normally ensures correct operation of the transmitter. When utilizing electronic synchronization transmitters, it normally is not necessary to provide the customary continuous maintenance associated with mechanical synchronization transmitters. It is necessary, however, to utilize supervision circuits to check the operation of the transmitters.

It is known that a plurality of synchronization transmitters may be provided wherein increased reliability of operation is obtained by automatically connecting a second synchronization transmitter to the associated system when and if a first synchronization transmitter malfunctions. This may be accomplished by utilizing a supervision circuit which recognizes the complete failure of the synchronous transmitter being used. However, such prior art circuits do not identify synchronization transmitters that do not fail completely but merely function defectively.

SUMMARY OF THE INVENTION

These and other defects of prior art systems are solved by the present invention wherein a supervision circuit is provided that employs logic circuitry to recognize defective synchronization transmitters connected thereto. The circuit supervises the operation of a plurality of synchronization transmitters, and provides an indication of the complete failure of any of the transmitters. Further, asynchronous operation of the plurality of transmitters connected to the supervision circuit is indicated.

The supervision circuit employs a plurality of logic components comprising transistors. Defective operation of any of the transmitters connected to the supervision circuit controls the transistors to specific operational states indicative of the operating condition of the transmitters connected to the supervision circuit. The derived criteria may be used to automatically cause disconnection of a defective transmitter and connection of a correctly functioning transmitter to the associated system. A plurality of transmitters may be connected to a single supervision circuit for supervision thereby. The invention thus identifies defective transmitters, as well as asynchronous operation of transmitters connected to the supervision circuit. Further, means are provided whereby the supervision circuit may be used to supervise a plurality of transmitters that transmit synchronization signals having different periods of reoccurrence. c

DETAILED DESCRIPTION OF THE INVENTION

Figure 1:
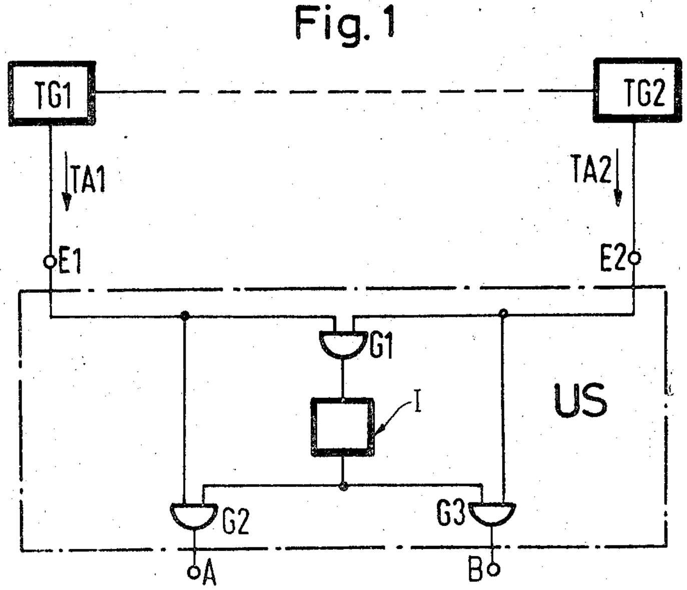
FIG. 1 is a block diagram of the logic circuit utilized according to the invention.

FIG. 1 shows the logic principals on which the invention is based. Synchronization transmitters TG1 and TG2 apply synchronizing signals TA1 and TA2 to input terminals E1 and E2, respectively, of supervision circuit US. The latter comprises AND gates G1 through G3 and inverter stage 1. Thus synchronizing signals TA1 are simultaneously applied to the inputs of AND gates G1 and G2 and synchronizing signals TA2 are simultaneously applied to the inputs of AND gates G1 and G3.

When synchronization transmitters TG1 and TG2 are functioning in synchronism, synchronizing signals TA1 and TA2 are simultaneously applied to input terminals E1 and E2 of supervision circuit US. The presence of synchronizing signals may be represented by binary 1, and the absence thereof by binary 0. In the former instance, AND gate G1 produces a binary 1 output signal that is inverted by inverter 1 which then applies a binary 0 input signal to AND gates G2 and G3. Therefore the application of synchronizing signals TA1 and TA2 simultaneously to AND gate G1 causes no output signal to be produced at output terminals A and B of AND gates G2 and G3, respectively.

Figure 2A:
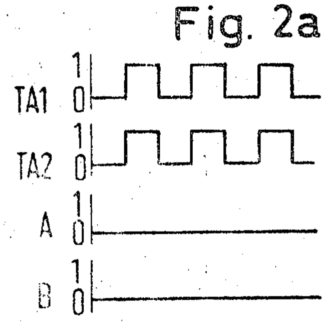
FIGS. 2*a*—2*d* are graphs showing the signals existing at various points in the logic circuit shown in FIG. 1 under different conditions.

FIG. 2*a* illustrates this principle, wherein a binary 1 is indicative of the presence of signals TA1 or TA2 and a binary 0 is indicative of the absence of synchronizing signals TA1 or TA2. Therefore it is seen that the simultaneous application of synchronizing signals TA1 and TA2 to AND gate G1 causes a binary 0 output to be produced by AND gates G2 and G3. This is indicative of correct operation of transmitters TG1 and TG2.

Figure 2B:
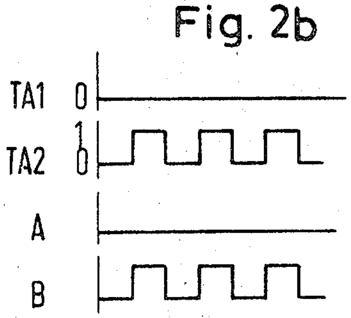
Figure 2C:
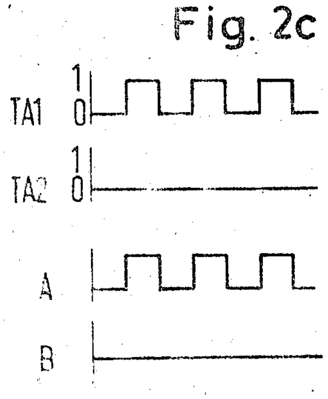

However, assume that synchronization transmitter TG1 is defective and that a binary 0 signal is continuously applied to AND gate G1. This causes a binary 0 signal is continuously applied to AND gate G1. This causes a binary 0 output to be produced by AND gate G1 that is inverted by inverter I, the latter thereby causing a binary 1 input to be applied to AND gates G2 and G3. Therefore, as shown in FIG. 2*b*, a binary 0 is produced at the output of AND gate G2 because its inputs comprise a binary 0 and a binary 1. Simultaneously a binary 1 output signal is produced by AND gate G3 because its inputs both comprise binary 1 when synchronizing signal TA2 is applied to terminal E2. Therefore the successive production of binary 1 signals at output terminal B of AND gate G3 is indicative of defective operation of synchronization transmitter TG1.

Similarly, successive binary 1 output signals are produced by AND gate G2 when synchronization transmitter TG2 is defective and synchronization transmitter TG1 produces the series of synchronizing signals TA1 shown.

Figure 2D:
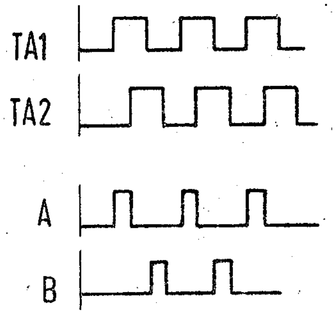

Synchronization transmitters TG1 and TG2 may operate to produce synchronizing pulses that are asynchronous as shown in FIG. 2*d*. During the portion of time that synchronizing signals TA1 and TA2 (binary 1) are simultaneously applied to AND gate G1, AND gates G2 and G3 will produce binary 0 outputs. During those periods of time that synchronization transmitter TG1 produces a binary 0 output and synchronization transmitter TG2 produce a binary 1 output, a binary 1 output will be produced by AND gate G3 and a binary 0 output will be produced by AND gate G2. Likewise, when synchronization transmitter TG2 produces a binary 0 output and synchronization transmitter TG1 simultaneously produces a binary 1 output, AND gate G2 will produce a binary 1 output and AND gate G2 will produce a binary0 output. The alternate production of binary 1 signals at output terminals A and B thereby provides an indication of asynchronous operation of synchronization transmitters TG1 and TG2. The criteria produced at output terminals A and B thus provides an indication of which of synchronization transmitters TG1 and TG2 is defective. However, if synchronization transmitters TG1 and TG2 produce asynchronous synchronizing signals, the criteria available at the output of AND gates G2 and G3 will provide an indication of this, but it cannot be determined therefrom which of the synchronization transmitters is defective.

The invention has been explained with reference to FIG. 1 according to the assumption that a defective synchronization transmitter produces a binary 0 output continuously. However, in practical embodiments of synchronization transmitters, a defective transmitter may produce a continuous binary 1 output. If transistors comprise the output circuits of the synchronization transmitters, this means that the transistor output of a defective synchronization transmitter is either continuously conductive or blocked, and it is essential to accurately identify the existence of both conditions.

Figure 3:
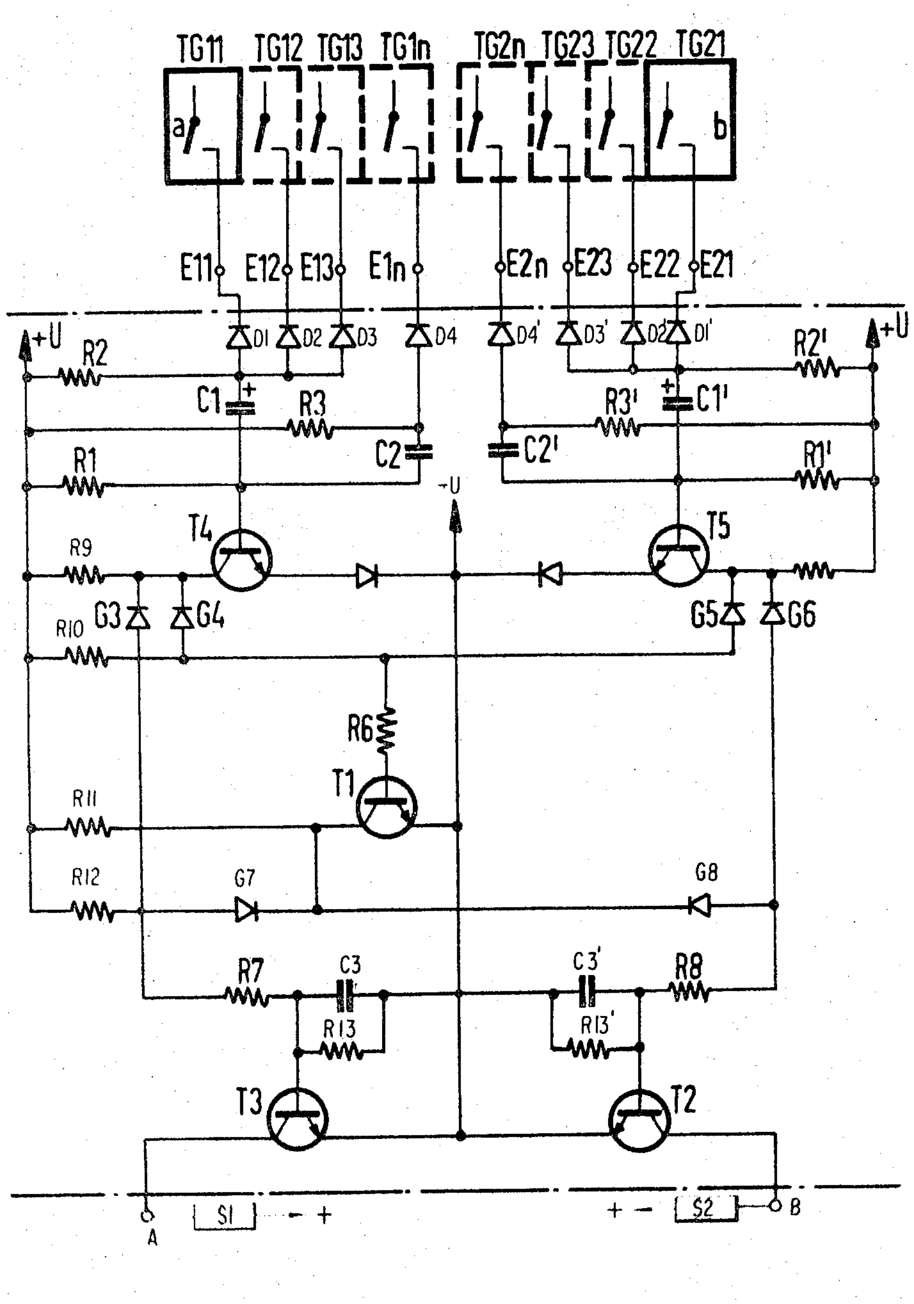
FIG. 3 is an electrical schematic diagram of a practical embodiment of the invention utilizing transistors in the supervision circuit.

A circuit according to the invention that provides such indications is shown in FIG. 3, wherein transistor T1 functions as AND gate G1 and inverter I, and transistors T2 and T3 function as AND gates G2 and G3, respectively. Transistors T4 and T5 serve to connect the outputs of the synchronization transmitter to the supervision circuit.

A plurality of synchronization transmitters may be provided comprising first and second groups of synchronization transmitters. Thus, synchronization transmitters TG11 through TG1*n* comprise a first group of transmitters, and synchronization transmitters TG21 through TG2*n* comprise a second group of transmitters. If it is assumed that both groups of synchronization transmitters operate properly, simultaneous synchronizing signals will be applied to the associated input terminals E11 through E1*n* and E21 through E2*n* by the first and second group of transmitters through selective actuation of contacts *a* and *b*, respectively.

For purposes of explaining the invention, it may be assumed that a binary 0 is applied to the associated input terminal of the supervision circuit when contacts *a* or *b* are actuated to the open position. Further, a binary 1 is applied to the associated input terminal of the supervision circuit when contacts *a or b* are actuated to the closed position.

If contact *a* of synchronization transmitter TG11 is in the open position, transistor T4 will be biased to the conducting state. This occurs because resistor R1 connects the positive DC supply terminal +U to the base of transistor T4, whereas the emitter thereof is connected to the negative DC supply terminal. Thus, the base of transistor T4 is biased positively with respect to the emitter and the base current produced charges capacitor C1 through resistor R2 according to the polarity shown. The forward biasing of transistor T4 causes conduction thereof to complete the circuit between the power supply terminals. The potential at the collector of transistor T4, which is then substantially clamped to the potential of the negative DC supply terminal is thus applied through diode G4 to resistor R6 and causes transistor T1 to be blocked from conduction.

If it is assumed that the two groups of transmitters are operating in synchronism, transistor T5 functions similarly as transistor T4, causing capacitor C1′ to be charged as illustrated simultaneously with the charging of capacitor C1. In this regard, elements having common identification characters with prime (′) designation function similarly as elements having the same identification characters.

When transistors T4 and T5 are conducting in the manner described above, transistors T3 and T2 will be blocked from conduction because the potentials at the collectors of transistors T4 and T5 are applied through diode G3 and resistor R7, and diode G6 and resistor R8, respectively, to the bases of transistors T3 and T2. The described conditions of transistors T2 and T3 are maintained during the application of binary 0 input signals to transistors T4 and T5, which as explained above, may correspond to actuation of contact *a* to the open position.

The application of synchronizing pulses to transistors T4 and T5 by the first and second groups of transmitters may be assumed to correspond to binary 1 inputs to the supervision circuit. For example, negative synchronizing pulses may be assumed to be indicative of the binary 1 condition, and these may be applied to the supervision circuit by the transmitters upon actuation of contacts *a* and *b* to the closed positions.

The application of negative synchronizing pulses to the supervision circuit causes the bases of transistors T4 and T5 to be driven sufficiently negative with respect to their emitters to drive transistors T4 and T5 to the nonconducting conditions. Further, capacitors C1 and C1′ then begin to discharge through resistors R1, R2 and R1′, R2′, respectively, causing the potential at the bases of transistors T4 and T5 to gradually become more positive. Thus blocking of transistors T4 and T5 is terminated either by removing the negative synchronizing pulses or by sufficient discharge of capacitors C1 and C1′ causing the bases of transistors T4 and T5 to become sufficiently positive with respect to their emitters to drive the transistors back to the conducting conditions.

The base of transistor T1 is connected to the positive supply terminal +U through resistors R6 by the series connection of resistor R9′ and diode G5 connected in parallel with resistor R10. When transistors T4 and T5 are blocked from conduction, it is thereby maintained sufficiently positive with respect to is its emitter to drive transistor T1 to the conducting state. The potential at the collector of transistor T1 is thereby substantially clamped to that of the negative supply source and is applied to the base of transistor T3 through the series connection of diode G7 and resistor R7, and to the base of transistor T2 through the series connection of diode G8 and resistor R8. The bases of transistors T2 and T3 are thereby biased sufficiently negative with respect to their emitters to cause the transistors to be blocked from conduction.

Summarizing, it is seen that when the transmitters are operating in synchronism and binary 0 signals are applied to the inputs of supervision circuits, transistors T4 and T5 are driven to the conducting states, and thereby cause transistors T3 and T2, respectively, to be driven to the nonconducting states. Thereby error indicating signals are not produced at output terminals A and B of transistors T3 and T2, respectively. However, when binary 1 signals corresponding to the application of negative synchronizing pulses are applied synchronously by the first and second group of transmitters to the supervision circuit, transistors T4 and T5 are driven to the nonconducting conditions, and transistor T1 is thereby driven to the conducting condition. Transistors T3 and T2 are driven to the non conducting conditions by transistor T1, and consequently error indicating signals are not produced at output terminals A and B of transistors T3 and T2, respectively. The lack of error indicating signals as explained with reference to FIGS. 1 and 2, is indicative of the fact that the transmitters are functioning correctly and in synchronism.

If synchronization transmitter TG11 is defective, contact *a* may be maintained continuously in either the open or closed position. This would of course mean that either a binary 0 or binary 1 is continuously applied to input terminal E11. In either case, transistor T4 will be driven to the conducting state. For example, if contact *a* is continuously open, the base current caused to flow as explained above will charge capacitor C1 and maintain transistor T4 in the conducting condition. If contact *a* is continuously closed, discharge of capacitor C1 causes the base of transistor T4 to be maintained sufficiently positive with respect to the emitter of transistor T4, even when synchronizing pulses are applied thereto, to cause transistor T4 to be driven to the conducting state.

If it is assumed that transmitter TG21 is functioning properly at this time, transistor T5 will be blocked by the synchronizing pulses applied thereto. Since transistor T4 is continuously conductive, the potential applied from the collector of transistor T4 to the base of transistor T3 through diode G3 and resistor R7 will bias the base of transistor T3 such that transistor T3 will be blocked form conduction. However, the blocking of transistor T5 by the synchronizing pulses will cause a signal to be applied to the base of transistor T2 through diode G6 and resistor R8 such that transistor T2 will be driven to conduction and supervision relay S2 connected in its collector output circuit may be made to cause connection of correctly operating transmitter TG21 to the appropriate circuit. For example, it may be desired to connect a properly operating synchronization transmitter to a subscriber in a telephone system. It is therefore seen that in the event a transmitter of one of the two groups of synchronized transmitters becomes defective, a transmitter in the other group may be automatically connected to the desired subscriber and the supervision circuit thereby provides continuous supervision.

Defective operation of transmitter TG21 likewise may cause connection of correctly operating transmitter TG11 to be made to the subscriber. In this event, as described above with reference to transistor T4, the continuous actuation of contact *b* to either the open or closed position causes transistor T5 to be maintained in the conducting condition. Transistor T2 will therefore be blocked and transistor T3 will be driven to the conducting condition in response to the synchronizing signals applied to transistor T4. Further, transistor T1 will also be blocked because the potential applied to the base thereof through resistor R9′diode G5, and resistor R6 will cause its base to be biased insufficiently positive with respect to its emitter to cause conduction of transistor T1. (This also occurs when transmitter TG11 is defective in the example given above.) This was explained above with reference to conduction of transistors T4 and T5 wherein the voltage developed at their respective collectors when they are conducting causes the potential applied to the base of transistor T1 to block said transistor from conduction. Under these conditions wherein transistor T3 is driven to the conducting state in response to synchronizing pulses applied by transmitter TG11 to the supervision circuit and transistor T2 is continuously blocked, supervisory relay S1 connected to output terminal A of transistor T3 may be energized to cause connection of correctly operating transmitter TG11 to the subscriber or consumer. Therefore, defective operation of transmitter TG21 can be made to cause connection of a properly operating synchronous transmitter TG11 to the subscriber through use of the described supervision circuit. The circuit for causing the desired substitution of connections in the event of failure of one of the transmitters is not shown since this is known in the art.

The supervision circuit shown in FIG. 3 also functions to cause an indication of asynchronous operation of the transmitters. That is, respective transmitters of the two groups of transmitters may operate to produce out-of-phase synchronizing signals. The case in which asynchronous pulses are applied in alternate manner to input terminal E11 and E21 by transmitters TG11 and TG21 may be used to explain operation of the supervision circuit under such circumstances. The successively applied synchronizing pulses transmitted by the two groups of transmitters as associated transmitters thereof are scanned will control transistors T4 and T5 alternately from the conductive to the blocked conditions thereby maintaining transistor T1 in the blocked condition. Therefore, transistors T3 and T2 will be controlled only by transistors T4 and T5, and the alternate controlling of the latter transistors to the blocked and conducting states cause the alternate controlling of transistors T3 and T2, respectively, to the blocked and conducting states.

Under these conditions, controlling of transistor T4 to the conducting condition and transistor T5 to the blocked condition will cause transistor T3 to be driven to the blocked condition and transistor T2 to be driven to the conducting condition. Likewise, when transistor T4 is controlled to the blocked condition and transistor T5 is controlled to the conducting condition, transistor T3 will be controlled to the conducting condition, and transistor T2 will be controlled to the blocked condition. Therefore, if supervision relays are connected to output terminals A and B, they will be alternately energized to provide an indication of the asynchronous operation of transmitters TG11 and TG21. The supervision circuit therefore responds to the asynchronous operation of transmitters comprising the two groups of transmitters although it does not provide an indication of which of the transmitters is deviating from synchronous operation. However this is not normally of significance because it is only necessary to provide an indication of asynchronous operation and additional means may be provided to determine which of the transmitters is functioning improperly.

If transmitters TG11 and TG21 are not exactly out of phase and portions of the respective synchronizing pulses are time coextensive as shown in FIG. 2D, error indicating signals will be produced at outputs A and B only during that period of time during which the synchronizing signals produced by transmitters TG11 and TG21 are not simultaneously applied to the supervision circuit.

The described supervision circuit shown in FIG. 3 may be used to supervise a plurality of synchronization transmitters comprising first and second groups of transmitters. Thus transmitters TG11 through TG1*n* comprise a first group of transmitters, and transmitters TG21 through TG2*n* comprise a second group of transmitters. A single resistive-capacitive circuit comprising resistor R2 and capacitor C1 may be employed by each group of transmitters if the output circuits of the latter are decoupled. Thus in FIG. 3, diodes D1 through D3 decouple transmitters TG21 through TG13, thereby enabling the utilization of a single resistive-capacitive circuit having a time constant equal to the time duration of the synchronizing pulses applied to the base of transistor T4, by transmitters TG11 through TG1*n*.

If a particular transmitter produces synchronizing signals having a time duration that is a whole number multiple of synchronizing signals produced by another transmitter, it is necessary to utilize a second resistive-capacitive network. According to the example shown in FIG. 3, associated synchronization transmitters TG1*n* and TG2*n* and TG2*n* may be assumed to produce synchronizing signals having a time duration that is a whole number multiple to of the time duration of synchronizing signals produced by other transmitters of their respective groups. Therefore second resistive-capacitive circuits comprising resistor R3 and capacitor C2 (and resistor R3′ and capacitor C2′) are utilized to produce the desired time constant required for the synchronizing pulses produced by transmitters TG1*n* and TG2*n*, respectively.

Transistors T2 and T3 are provided with parallel resistive-capacitive circuits connected in their base circuits. Thus resistor R13 and capacitor C3 is connected in the base circuit of transistor T3, and resistor R13′ and capacitor C3′ is connected in the base circuit of transistor T2. These serve to bias the respective transistors to provide equalized output signals therefrom, which otherwise may not result because of variances in the time duration of the synchronizing pulses produced by the transmitters or of the time constants of the resistive-capacitive circuits connected between the transmitters and the supervision circuit.

The invention has been explained with reference to NPN transistors, and the appropriate biasing circuits are shown in association therewith. However, it is apparent that the invention can be modified to function with the utilization of other type conductivity transistors with appropriate changes being made in the biasing thereof without departing form the spirit of the invention.

I claim:

1. A circuit to supervise first (TG11) and second (TG21) synchronization transmitters normally functioning to produce synchronous first (TA1) and second (TA2) synchronizing signals, respectively, comprising:

first switching means (G1, I; T4, T5, T1) connected to the outputs of the first and second synchronization transmitters, the switching state thereof being controlled in response to signals applied thereto by the first and second synchronization transmitters to produce first and second indicating signals corresponding to the operating states of the first and second synchronization transmitters, respectively;

second (G2, T3) and third (G3, T2) switching means connected to the first switching means to receive the first and second indicating signals, respectively;

first (S1) and second (S2) indicating means connected to the second (G2, T3) and third (G3, T2) switching means, respectively, the second switching means (G2, T3) being responsive to the first indicating signals produced by the first switching means in response to nonfunctioning of the second synchronization transmitter (TG21) to cause activation of the first indicating means (S1) to produce an indication thereof; the third switching means (G3, T2) being responsive to the second indicating signals produced by the first switching means in response to nonfunctioning of the first synchronization transmitter (TG11) to cause activation of the second indicating means (S2) to produce an indication thereof; the second (G2, T3) and third (G3, T2) switching means being alternately responsive to the first and second indicating signals, respectively, produced by the first switching means when the first (TG11) and second (TG21) synchronization transmitters are functioning asychronously to cause corresponding alternate activation of the second (S2) and first (S1) indicating means, respectively to produce an indication thereof.

2. The circuit recited in claim 1 wherein the first switching means comprise first (T4) and second (T5) transistors having inputs connected to the outputs of the first (TG11) and second (TG21) synchronization transmitters, respectively, and a third transistor (T1) having its input connected to the outputs of the first (T4) and second (T5) transistors;

the second and third switching means comprising fourth (T3) and fifth (T2) transistors, respectively, having inputs connected to the outputs of the first (T4) and third (T1), and second (T5) and third (T1), transistors, respectively;

biasing means (G3-G7, R6-R8) connected to the circuit to cause the first (T4) and second (T5) transistor to selectively control conduction of the fourth (T3) and fifth (T2) transistors, respectively, when the first (TG11) and second (TG21) synchronization transmitters are not functioning normally, and to cause the third transistor (T1) to control conduction of the fourth (T3) and fifth (T2) transistors when the first (TG11) and second (TG21) synchronization transmitters are functioning normally.

3. The circuit recited in claim 2 further comprising first (C1, R2) and second (C1', R2') resistive-capacitive means interposed between the first (TG11) and second (TG21) synchronization transmitters and the first (T1) and second (T2) transmitters, respectively, having time constants corresponding to the time duration of the first and second synchronizing signals to enable the latter to control conduction of the first (T1) and second (T2) transistors, respectively, during the time duration thereof.

4. The circuit recited in claim 3 further comprising a plurality of first and second synchronization transmitters that form first (TG11—TG1*n*) and second (TG21—TG2*n*) groups of synchronization transmitters, the first (C1, R2) and second (C1', R2') resistive-capacitive means being interposed between the fist and second groups of synchronization transmitters and the first (TG11) and second (TG21) transistors, respectively.

5. The circuit recited in claim 4 further comprising a plurality of first (D1—D4) and second (D1'—D4') -D4') decoupling means interposed between each of the plurality of first and second synchronization transmitters and the first and second resistive-capacitive means, respectively.

6. The circuit recited in claim 5 further comprising: additional resistive-capacitive means connected between additional first and second synchronization transmitters comprising the first and second groups of transmitters that produce synchronizing signals of time duration that is a whole number multiple of the time duration of the first and second synchronizing signals produced by the other synchronization transmitters comprising the same group and the first and second transistors, respectively, the time constant of the additional resistive-capacitive means corresponding to the time duration of the synchronizing signals of the additional first and second synchronization transmitters to enable control of conduction of the first and second transistors for the time duration of the latter.

7. The circuit recited in claim 3 wherein the first (C1, R2) and second (C1', R2') resistive-capacitive means are interposed between the first (TG11) and second (TG21) synchronization transmitters and the base circuits of the first (T1) and second (T2) transistors, respectively.

8. The circuit recited in claim 6 wherein the first (C1, R2) and second (C1', R2') resistive-capacitive means are interposed between the first (TG11) and second (TG21) synchronization transmitters and the base circuits of the first (T1) and second (T2) transistors, respectively.